US010652174B2

(12) United States Patent
Harinarayanan (10) Patent No.: US 10,652,174 B2
(45) Date of Patent: May 12, 2020

(54) REAL-TIME MESSAGE-BASED INFORMATION GENERATION

(71) Applicant: Wipro Limited, Bangalore (IN)

(72) Inventor: Sreeja Harinarayanan, Udumalpet (IN)

(73) Assignee: Wipro Limited, Bangalore (IN)

( * ) Notice: Subject to any disclaimer, the term of this patent is extended or adjusted under 35 U.S.C. 154(b) by 622 days.

(21) Appl. No.: 15/047,698

(22) Filed: Feb. 19, 2016

(65) Prior Publication Data

US 2017/0201472 A1    Jul. 13, 2017

(30) Foreign Application Priority Data

Jan. 7, 2016 (IN) .............................. 201641000634

(51) Int. Cl.
*H04L 12/58* (2006.01)
*H04L 29/08* (2006.01)

(52) U.S. Cl.
CPC ............ *H04L 51/04* (2013.01); *H04L 51/066* (2013.01); *H04L 51/20* (2013.01); *H04L 67/06* (2013.01)

(58) Field of Classification Search
CPC ....... H04L 51/04; H04L 51/066; H04L 51/20; H04L 67/06
See application file for complete search history.

(56) References Cited

U.S. PATENT DOCUMENTS

| 7,139,779 | B1 * | 11/2006 | Kornelson | ........ G06F 17/30563 |
| 7,716,241 | B1 * | 5/2010 | Mazzagatti | ......... G06F 16/2246 |
| | | | | 707/782 |
| 7,720,873 | B2 * | 5/2010 | Loving | ............. G06F 17/30297 |
| | | | | 707/802 |
| 8,032,397 | B2 * | 10/2011 | Lawless | .............. G06F 19/3418 |
| | | | | 705/3 |

(Continued)

OTHER PUBLICATIONS

Syncsort—Abstract; The Total Economic Impact of Syncsort DMExpress™; published Feb. 20, 2012 (2 pgs.).

(Continued)

*Primary Examiner* — Joe Chacko
(74) *Attorney, Agent, or Firm* — Finnegan, Henderson, Farabow, Garrett & Dunner, LLP (57) ABSTRACT

This disclosure relates generally to data processing, and more particularly, to methods and systems for real-time message-based information generation. In one embodiment, a system for real-time message-based information generation is provided. The system comprises one or more hardware processors, and a memory storing instructions executable by the one or more hardware processors that support multiple-thread processing for: receiving a plurality of input data files, each input data file comprising a plurality of records; extracting, from each input data file, the plurality of records on a record-by-record basis; transforming each extracted record from among the plurality of extracted records to comply with a messaging format; constructing a unique message for each transformed record according to (Continued)

the messaging format; and transferring, immediately upon construction, the message to a second system using an Application Programming Interface (API), wherein the message enables the second system to generate information based on a transformed record.

20 Claims, 5 Drawing Sheets

(56) References Cited

U.S. PATENT DOCUMENTS

| | | | | |
|---|---|---|---|---|
| 2005/0071842 A1* | 3/2005 | Shastry | ............... | G06F 9/5038 |
| | | | | 718/100 |
| 2006/0178910 A1* | 8/2006 | Eisenberger | ........... | G06Q 10/00 |
| | | | | 705/3 |
| 2007/0207774 A1* | 9/2007 | Hutchinson | ........... | H04L 41/069 |
| | | | | 455/406 |
| 2007/0215696 A1* | 9/2007 | Macnish | ............... | G06Q 30/02 |
| | | | | 235/380 |
| 2015/0206087 A1* | 7/2015 | Tavares | ............ | G06Q 10/06393 |
| | | | | 705/7.34 |
| 2015/0319116 A1* | 11/2015 | Chavali | ............... | H04L 12/1895 |
| | | | | 709/206 |

OTHER PUBLICATIONS

Oracle® Fusion Middleware Developer's Guide for Oracle Data Integrator 11g Release 1 (11.1.1); E12643-05; dated Nov. 2011 (500 pgs.).

\* cited by examiner

| Customer ID | Latitude | Longitude | Generation Time |
|---|---|---|---|
| 12345 | S52° 26' 59.9" | N13° 23' 36.11" | 1:00 pm |
| 67890 | S52° 26' 59.8" | N13° 23' 36.10" | 1:00 pm |
| 33341 | S53° 26' 59.8" | N14° 23' 36.12" | 1:00 pm |

202 — row 1; 204 — row 2; 206 — row 3

210

| Customer ID | Shopping Preference |
|---|---|
| 12345 | Toys |
| 67890 | Garments |

212 — row 1; 214 — row 2

220

| Customer ID | Latitude | Longitude | Expiration Time | Destination |
|---|---|---|---|---|
| 12345 | S52° 26' 59.9" | N13° 23' 36.11" | 1:02pm | CEP system 160 |
| 67890 | S52° 26' 59.8" | N13° 23' 36.10" | 1:02pm | CEP system 160 |

222 — row 1; 224 — row 2

230

| Customer ID | Shopping preference | Expiration Time | Destination |
|---|---|---|---|
| 12345 | Toy | 1:02pm | CEP system 160 |
| 67890 | Garment | 1:02pm | CEP system 160 |

232 — row 1; 234 — row 2

FIG. 5: Example Computer System

REAL-TIME MESSAGE-BASED INFORMATION GENERATION

TECHNICAL FIELD

This disclosure relates generally to data processing, and more particularly, to method and systems for real-time message-based information generation.

BACKGROUND

Data analytics, such as in the field of complex event processing (CEP), may require real-time performance in order for responses generated from received data to remain timely and relevant. For example, in the field of retail, a system operated by vendor can generate shopping information (e.g., advertisement of a product, locate a product in a shop, etc.) for a potential customer based on location information of the person. Often times, the system must provide the shopping information to the customer in a timely manner (e.g., while the person remains at the retail location) to avoid the shopping information becoming stale and/or irrelevant.

Also, real-time processing of data from multiple, different sources may be needed to generate a response. Using the retail example above, the system may receive identification information, preference information, location information of the potential customer, product advertisement information, etc. from different data sources, and process the information in real-time to generate the afore-mentioned shopping information. Each of the data sources typically stores multiple records, with each record representing an association among at least some of the information. For example, one of the data sources may store records that associate customers with their location information, while another data source may store records that associate location information with product information. To generate the additional information (e.g., the response with shopping information) as described above, the system may need to acquire these records from different data sources in real-time.

A conventional system typically accumulates records before generating additional information. For example, in the retail environment above, a conventional system may accumulate records for all of the potential customers at a specific location before passing the accumulated records on for further shopping information generation.

The inventors here have recognized several technical problems with such conventional systems. First, by delaying generation of additional information until the records are accumulated, response time is increased. Further, these delays can also depend on the number of records to be accumulated, adding unpredictability to response times. Moreover, such an arrangement fails to leverage multi-thread computing resources efficiently by forcing thread execution (e.g., for transmitting the records or for generation of additional information) to be put on hold until the records are accumulated, even when there are other threads available for execution of the transmission of the record and/or the generation of the additional information.

SUMMARY

Embodiments of the present disclosure present technological improvements as solutions to the above-mentioned technical problems, among others. For example, in one embodiment, a a system for real-time message-based information generation is provided. The system comprises one or more hardware processors, and a memory storing instructions executable by the one or more hardware processors that support multiple-thread processing for: receiving a plurality of input data files, each input data file comprising a plurality of records; extracting, from each input data file, the plurality of records on a record-by-record basis; transforming each extracted record from among the plurality of extracted records to comply with a messaging format; constructing a unique message for each transformed record according to the messaging format; and transferring, immediately upon construction, the message to a second system using an Application Programming Interface (API), wherein the message enables the second system to generate information based on a transformed record.

In another embodiment, a method for real-time message-based information generation is provided. The method can be performed by one or more hardware processors that support multiple-thread processing and comprises: receiving a plurality of input data files, each input data file comprising a plurality of records; extracting, from each input data file, the plurality of records on a record-by-record basis; transforming each extracted record from among the plurality of extracted records to comply with a messaging format; constructing a unique message for each transformed record according to the messaging format; and transferring, immediately upon construction, the message to a second system using an Application Programming Interface (API), wherein the message enables the second system to generate information based on a transformed record.

In yet another embodiment, a non-transitory computer readable storage medium storing a program that, when executed by one or more hardware processors that support multiple-thread processing, causes the one or more hardware processors to perform a method for real-time message-based information generation, is provided. The method comprises: receiving a plurality of input data files, each input data file comprising a plurality of records; extracting, from each input data file, the plurality of records on a record-by-record basis; transforming each extracted record from among the plurality of extracted records to comply with a messaging format; constructing a unique message for each transformed record according to the messaging format; and transferring, immediately upon construction, the message to a second system using an Application Programming Interface (API), wherein the message enables the second system to generate information based on a transformed record.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Illustrative embodiments of the present disclosure are listed below. In one embodiment, a system for real-time message-based information generation is provided. The system comprises one or more hardware processors, and a memory storing instructions executable by the one or more hardware processors that support multiple-thread processing for: receiving a plurality of input data files, each input data file comprising a plurality of records; extracting, from each input data file, the plurality of records on a record-by-record basis; transforming each extracted record from among the plurality of extracted records to comply with a messaging format; constructing a unique message for each transformed record according to the messaging format; and transferring, immediately upon construction, the message to a second system using an Application Programming Interface (API), wherein the message enables the second system to generate information based on a transformed record.

With embodiments of the present disclosure, additional information can be generated, in real-time, based on input data files. Embodiments of the present disclosure can be used in different industries and environments. For example, in the retail environment, the additional information can be related to, for example, a real-time offer by a vendor of merchandise to a potential customer that is generated based on location information of the potential customer. Given that the potential customer can move around and, for example, leave the retail environment at any time, the relevance of the offer information can become time-sensitive. By reducing the processing latency associated with acquiring the location information of the customer and generating real-time offer information, system processing is increased and the relevanc of the offer information is improved. It is appreciated that the disclosed embodiments are not limited to real-time offers, or even any particular industry, and can be used in any environment where the generation of a timely response is desirable. For example, the disclosed embodiments can also be used in banking, energy, utility, etc.

Figure 1:
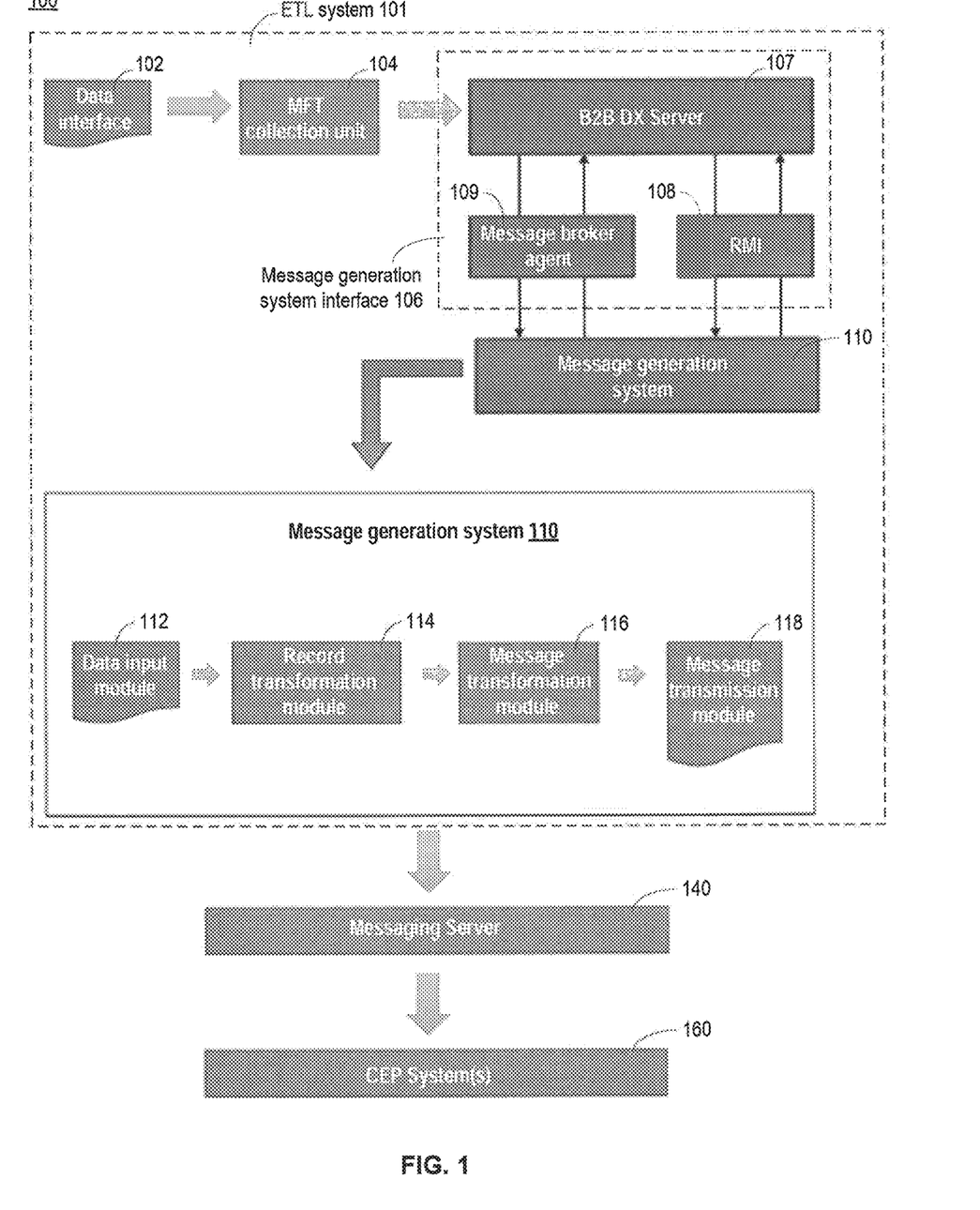
FIG. 1 illustrates an exemplary real-time message-based data analytics system according to some embodiments of the present disclosure.

FIG. 1 illustrates an exemplary real-time message-based data analytics system 100, according to some embodiments of the present disclosure. As shown in FIG. 1, system 100 include an Extract Transform Load (ETL) system 101 configured to extract data from various data sources, and transform the extracted data from the data format of a source data system into the data format of a destination data system. In some embodiments, as to be discussed below, the transformation can include at least one of: data filtration, enrichment, data reduction, and event routing. ETL system 101 can then load (e.g., transfer) the transformed data to the destination data system.

The destination data system can be a messaging server. For example, as shown in FIG. 1, ETL system 101 can be communicatively coupled to a messaging server 140 configured to provide message communications. The message communication can be asynchronous (e.g., a system can initiate the transmission of a message by placing the message in a message queue without waiting for a reply for the target recipient), and can be performed according to various protocols, such as Java Message Service (JMS). For example, messaging server 140 can be a Java enabled messaging server, such as a TIBCO™ Enterprise Messaging Server. In this example, ETL system 101 can transform data collected from a source into a message format according to JMS, and then initiate transmission of the message by placing the message in a message queue at messaging server 140, which can transmit the message to, for example, one or more complex event processing (CEP) systems 160 configured to generate a response based on the message. In some embodiments, system 100 can also include a logging database (not shown in FIG. 1) configured to store at least some of the transformed data from ETL system 101 (which may or may not be of JMS message format) for auditing.

In some embodiments, ETL system 101 can further include a data interface 102, a managed file transfer (MFT) collection unit 104, a message generation system interface 106, and a message generation system 110.

Data interface 102 can be an interface configured to receive data from various data sources. For example, in a case where location information is received from one or more global positioning system (GPS) devices, data interface 102 can include a wireless interface configured to receive GPS data from one or more wireless devices (e.g., a smart phone). Also, data representing identification information and preference information of potential customers can also be acquired through data interface 102. For example, the identification information can include an identifier of a customer, and can be associated with the customer's location information. Also, the preference information can include shopping preference information (e.g., a type of merchandise the customer has recently purchase, indicated as a favorite, etc.), and can also be associated with the customer identifier. As to be discussed below, the information can be transmitted as separate messages in real-time, which can then be processed and correlated by CEP systems 160 to generate merchandise offer information based on an identity of the customer, the location of the customer, and the shopping preference of the customer. The data can then be written into one or more files by data interface 102, which can then provide the files to MFT collection unit 104.

MFT collection unit 104 can manage the collection of the files from data interface 102. For example, MFT collection unit 104 can schedule the collection of the files from data interface 102 at specific times (e.g., on a certain time interval, upon detection of an event, etc.) and simultaneously from different data sources. For example, at scheduled times, MFT collection unit 104 can collect the files and provide the files to message generation system interface 106. In some embodiments, the files can be stored at a certain database (not shown in FIG. 1), and MFT collection unit 104 can provide path information (e.g., in the form of an Universal Resource Locator (URL)) of the files to message generation system interface 106.

Message generation system interface 106 can be configured to initiate message generation by message generation system 110 based on, for example, the file data provided by MFT collection unit 104. The initiation can be specific to message generation system 110. As an illustrative example, in a case where message generation system 110 includes a server implementing Informatica™ PowerCenter™ workflow, the initiation can include transmission of a request for data transformation to the server and receiving an acknowledgment from the server (e.g., a handshake). In such a case, as shown in FIG. 1, message generation system interface 106 can include a business to business data exchange (B2B DX) server 107 to initiate the handshake with message generation system 110, and an application programming interface (API) such as remote method invocation (RMI) 108 that enables message generation system 110 to communicate with B2B DX server 107, to perform the handshake. In some embodiments, each handshake can be associated with an unique identifier and a status, and the handshake information, together with the associated identifier and status, can be stored at the aforementioned logging database for auditing purpose.

In some embodiments, message generation system interface 106 can also include a message broker agent 109 for providing data for the handshake. For example, as discussed before, MFT collection unit 104 can provide path information (e.g., an URL) for the files storing data received from data interface 102, and become a party to the handshake. Message broker agent 109 can store the path information and provide the path information to B2B DX server 107, which enables B2B DX server 107 to extract the file data using the path information and provide the data to message generation system 110 for transformation. Message broker agent 109 can also manage the transmission of data to message generation system 110. For example, message broker agent 109 can manage a queue that stores requests for message generation (e.g., a JMS queue), and provide path information to B2B DX server 107 based on an order of requests for message generation in the queue. B2B DX server 107 may transfer the data for transformation according to the order of requests in the queue. Further, message broker agent 109 can also provide other information, such as routing information (e.g., destination(s) for the message to be generated), transformation information (e.g., what information is to be included in the message), etc., to message generation system 110 for inclusion in a request for data transformation. In some embodiments, message broker agent 109 can include Apache™ ActiveMQ™ and/or a platform that provides web services.

Message generation system 110 can be configured to transform the extracted data from the data format of a source data system (e.g., GPS data, personal information, etc. received from data interface 102) into the data format of a destination data system (e.g., messaging server 140). As shown in FIG. 1, message generation system 110 can include a data input module 112, a record transformation module 114, a message transformation module 116, and a message transmission module 118.

Figure 2:
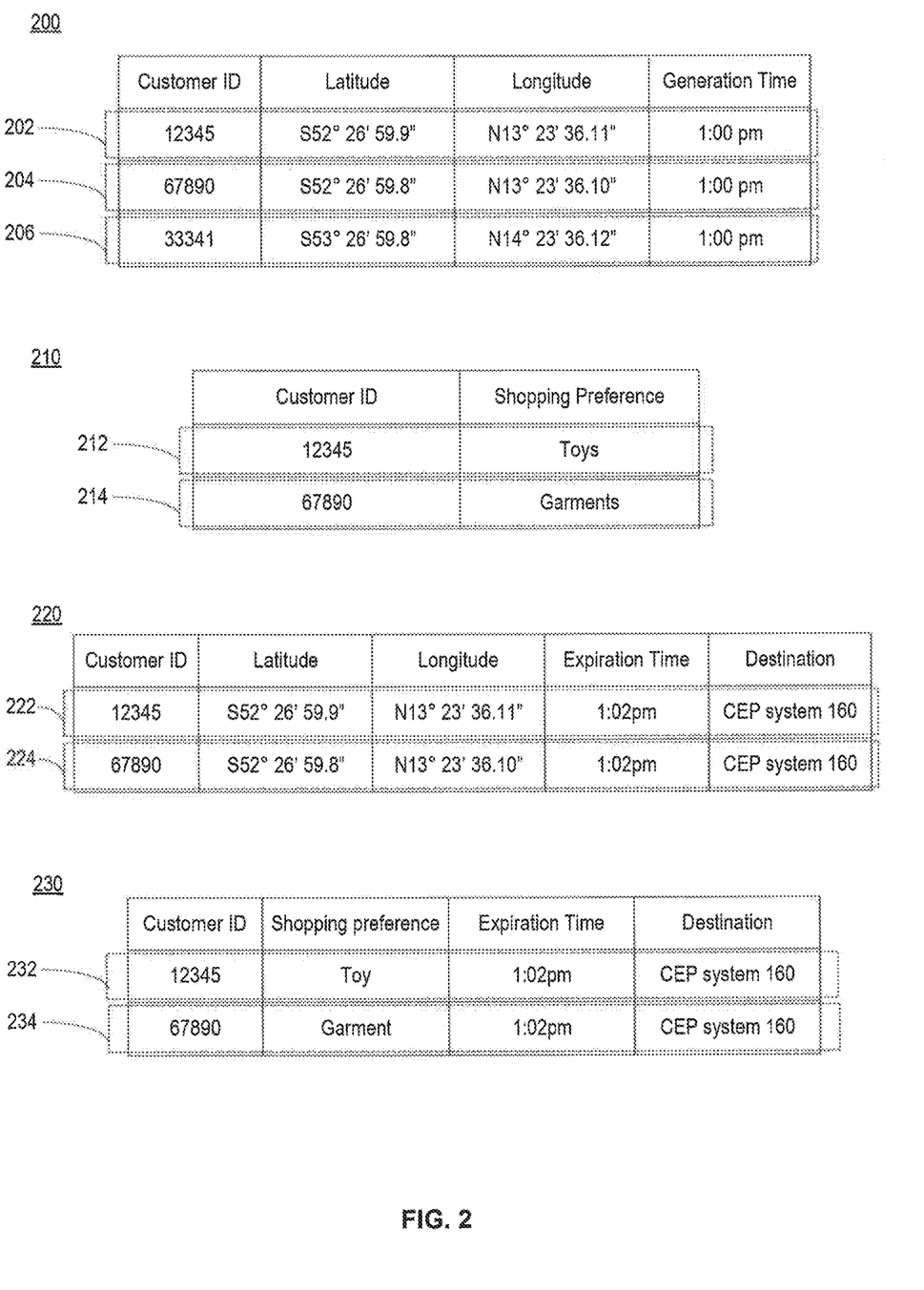
FIG. 2 illustrates exemplary data records processed and generated by an exemplary real-time message-based data analytics system according to some embodiments of the present disclosure.

Data input module 112 can be configured to acquire data to be transformed. Data input module 112 can perform the handshake with B2B DX server 107 (or MFT unit 104) via message broker agent 109 to acquire the data. The data can include multiple data records, with each data record representing an association between different information. Reference is now made to FIG. 2, which illustrates exemplary data records 200 and 210 to be processed by an exemplary real-time message-based data analytics system (e.g., ETL system 101 of FIG. 1), and exemplary data records 220 and 230 to be generated by ETL system 101. As shown in FIG. 2, data records 200 include data records 202, 204, and 206, each associating a customer identifier (e.g., a customer ID) with location information (e.g., latitude and longitude of the customer, coordinates within a retail environment, etc.) and generation time information (e.g., the time at which the location information is acquired). Also, data records 210 include data records 212 and 214, each associating a customer ID with shopping preference information. Data input module 112 can acquire the data files based on path information provided in the request for data transformation from B2B DX server 107.

Referring back to FIG. 1, after data input module 112 acquires data records 200 and 210, it can provide the data records to record transformation module 114. In some embodiments, record transformation module 114 can perform one or more transformation of the data records. The transformation can include at least one of: data filtration, enrichment, data reduction, and event routing. For example, referring back to FIG. 2, record transformation module 114 can generate data records 220 and 230 based on a transformation of data records 200 and 210. As to be discussed below, information of data records are to be transmitted in messages to a messaging server (e.g., messaging server 140), which can transmit the messages to other systems (e.g., CEP systems 160) to generate one or more responses.

Record transformation module 114 can be configured to perform data filtration to generate data records 220 and 230, based on a predetermined condition. As an illustrative example, record transformation module 114 can determine to filter out data record 206 based on the associated location information. As shown in FIG. 2, the location associated with data record 206 is separated from those associated with data records 202 and 204 by more than one degree in latitude and in longitude. Based on this information, record transformation module 114 can determine to exclude data record 206 from record transformation.

Further, record transformation module 114 can perform data enrichment and event routing to data records 200 and 210 to generate data records 220 and 230. For example, as shown in FIG. 2, data records 220 include record 222 and 224, with record 222 including customer ID and location information extracted from data record 202, and data record 224 including customer ID and location information extracted from data record 204. Moreover, each of data records 222 and 224 also include additional data for expiration time information and destination information. In some embodiments the expiration time information can be determined based on the generation time information. For example, as shown in FIG. 2, the expiration time can be generated by adding two minutes to the time of generation of the location information. The expiration time can set a window within which a message including contents of a data record (e.g., data record 222) is to be transmitted to CEP systems 160 to generate a response, to improve the timeliness of the response. For example, in a case where a real-time offer of a merchandise is to be provided to a potential customer based on the customer's location, such a window can is improve the likelihood that offer is provided when the customer is still at that location. The expiration time can be set based on a variety of factors including, for example, the physical size of the store, the rate at which the customer is traveling, a preference of the retailer environment where the customer is located, etc.

On the other hand, the destination information can be used for routing a message and can also be determined based on a predetermined condition. For example, based on the sources of data records 200 and 210, the system can determine that the destination for message generated from the transformation of data records 200 and 210 to CEP systems 160, and include the destination information in data records 222 and 224. Further, data records 230 includes data records 232 and 234, with each data record including customer ID and shopping preference information extracted from data records 212 and 214, as well as the aforementioned expiration time information and destination information.

Referring back to FIG. 1, after record transformation module 114 performs one or more transformations of data records received from data input module 112 (e.g., data records 200 and 210) and generate a data record (e.g., a data record 232), record transformation module 114 can provide a generated data record to message transformation module 116 to generate a message for the generated data record. In some embodiments, the message can be compliant with the Java Message Service (JMS) format. A JMS message can include a header and a body. Table 1 below illustrates the field definitions of a JMS header:

TABLE 1

| Field | Description |
| --- | --- |
| JMSMessageID | Message identifier |
| JMSDestination | Destination to which message is sent |
| JMSReplyTo | Destination to which to reply |
| JMSCorrelationID | Link to related message |
| JMSDeliveryMode | Delivery mode (persistent or non-persistent) |
| JMSPriority | Priority level |
| JMSTimestamp | Time of transmission |
| JMSExpiration | Expiration time |
| JMSType | Message type |
| JMSRedelivered | Has message been delivered before? |

Further, JMS may include six classes (or types) of messages, each with a certain body format. Table 2 below illustrates an exemplary body format for each of the six classes of the messages:

TABLE 2

| Class | Body Content Description |
| --- | --- |
| Text message | Contains a Java string |
| Stream message | Contains a stream of Java primitive values, written and read sequentially. |
| Map message | Contains a set of name-value pairs, where each name is a string and each value is a Java primitive value. The order of the entries is undefined; they can be accessed randomly by name or enumerated sequentially. |
| Object message | Contains a serialized Java object (which may in turn be a collection of other objects). |
| Bytes message | Contains a stream of uninterpreted bytes. |
| Null message | Consists of a header and properties only, with no message body |

As discussed above, message transformation module 116 can generate a message for each of the transformed data records (e.g., data record 222). The generation can include creating a JMS map message that includes a set of name-value pairs extracted from, for example, data record 222. A sample JMS message constructed based on data record 222 can be as follows:

```
(Header)
<JMSMessageID> 1 </ JMSMessageID>
<JMSDestination> CEP160.queue </ JMSDestination>
<JMSExpiration> 13:02 </ JMSExpiration>
(Body begins)
<CustomerID> 12345 </ CustomerID >
<Latitude> S52-26-59.9 </ Latitude>
<Longitude> N13-23-36.11 </ Longitude>
```

Each JMS message can have a unique combination of header and/or body contents.

Message transformation module 116 can provide the message to message transmission module 118 which can initiate a transmission of the message in real-time by putting the message in a message queue of messaging server 140. In a case where messaging server 140 includes computing resources that support multiple threads, each thread being associated with a message queue, different messages corresponding to different data records can be put in different message queues based on various parameters, such as priority, expiration time, etc., included in the JMS headers of these messages. Both the creation of a message and the initiation of transmission for the message can be performed by, for example, message transformation module 116 executing one or more application programming interfaces (APIs). In a case where messaging server 140 is a Java enabled messaging server, message transformation module 116 can execute one or more JMS APIs to create and transmit the message. When a thread becomes available, a message stored at the message queue associated with the available thread can be transmitted.

In some embodiments, ETL system 101 can also include computing resources that support multiple threads, and the messages for data records 222, 224, 232, and 234 can be generated concurrently during the concurrent execution of multiple threads.

With messages being generated concurrently, and the messages being put in message queues associated with different threads that can also be executed concurrently, the messages associated with different data records can be transmitted by messaging server 140 to CEP systems 160 in real-time when they are generated. As a result, CEP systems 160 can generate one or more responses based on these messages within a shorter period of time, and the CEP systems can become more responsive.

Figure 3:
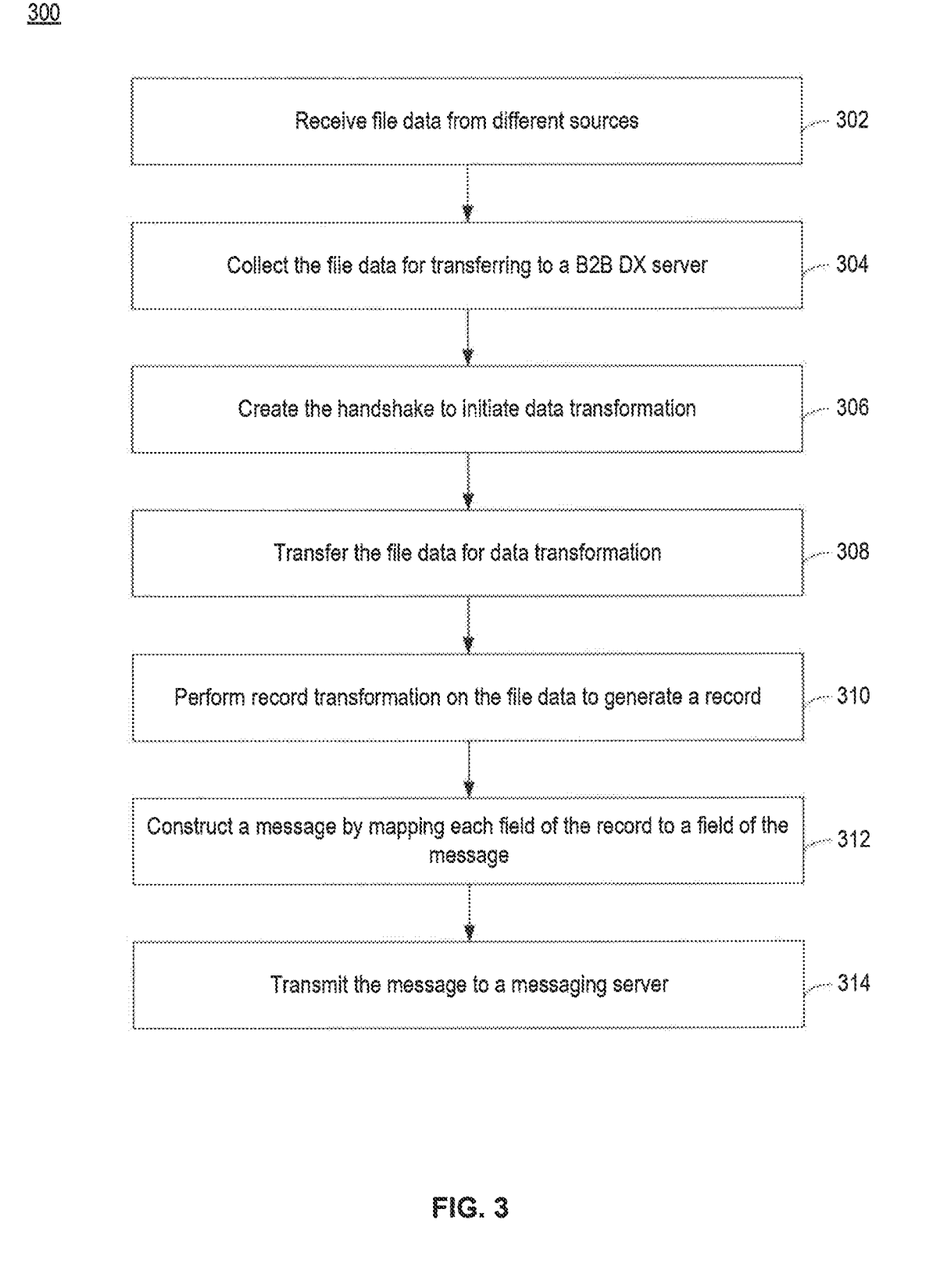
FIG. 3 illustrates an exemplary real-time message-based data analytics method according to some embodiments of the present disclosure.

FIG. 3 is a flow diagram illustrating an exemplary real-time message-based data analytics method 300 in accordance with some embodiments of the present disclosure. In some embodiments, method 300 can be performed by an ETL system (e.g., ETL system 101 of FIG. 1).

In step 302, the system can receive file data from different sources. For example, the data sources can be a GPS device, location monitoring systems (e.g., tracking customer traffic, etc.), one or more data sources storing customer information, one or more data sources storing retailer information (e.g., marketing campaign information, etc.), and others. The file data can include multiple data records, such as data records 210, 220, and 230 of FIG. 2. In some embodiments, step 302 can be performed by data interface 102 of FIG. 1.

In step 304, the system can collect the file data for transferring to a B2B DX server (e.g., B2B DX server 107 of FIG. 1). For example, the system can generate path information associated with the file data. In some embodiments, step 304 can be performed by MET collection unit 104 of FIG. 1.

In step 306, the system can establish a handshake with a message generation system (e.g., message generation system 110 of FIG. 1) to initiate a transformation of the file data collected in step 304. Step 306 can include, for example, B2B DX server 107 retrieving file data based on the path information generated by MFT collection unit 104 and provided by message broker agent 109, and transmitting a request for data transformation to message generation system 110. In some embodiments, step 304 can be performed by message generation system interface 106 of FIG. 1.

In step 308, the system can transfer the file data from B2B DX server 107 to message generation system 110 for data transformation. In some embodiments, the file data transfer can be managed by message broker agent 109. For example, message broker agent 109 can manage a queue that stores requests for message generation (e.g., a JMS queue) and provide path information to B2B DX server 107 based on an order of requests for message generation in the queue. This may allow B2B DX server 107 to transfer the data for transformation according to the order of requests in the queue. In some embodiments, step 308 can be performed by message generation system interface 106 (e.g., message broker agent 109) of FIG. 1, In step 310, the system can perform record transformation on the file data to generate a data record. The record transformation can include at least one of: data filtration, enrichment, data reduction, and event routing. In some embodiments, step 310 can be performed by record transformation module 114 of FIG. 1.

In step 312, the system can construct a message by mapping each field of the data record to a field of the message. The message can be compliant with the Java Message Service (JMS) format and can include a header and a body, with the fields of the data record can be mapped to various fields of the header and the body. In some embodiments, step 312 can be performed by message transformation module 116 of FIG. 1.

In step 314, when a message is constructed in step 312, the system can transmit the message, in real-time, to a messaging server, such as a Java enabled messaging server, so that the server can transmit the message to a downstream system (e.g., CEP systems 160 of FIG. 1). In some embodiments, the system can initiate the transmission of the message by putting the message in a message queue associated with a thread. In some embodiments, step 314 can be performed by message transmission module 118 of FIG. 1

Figure 4:
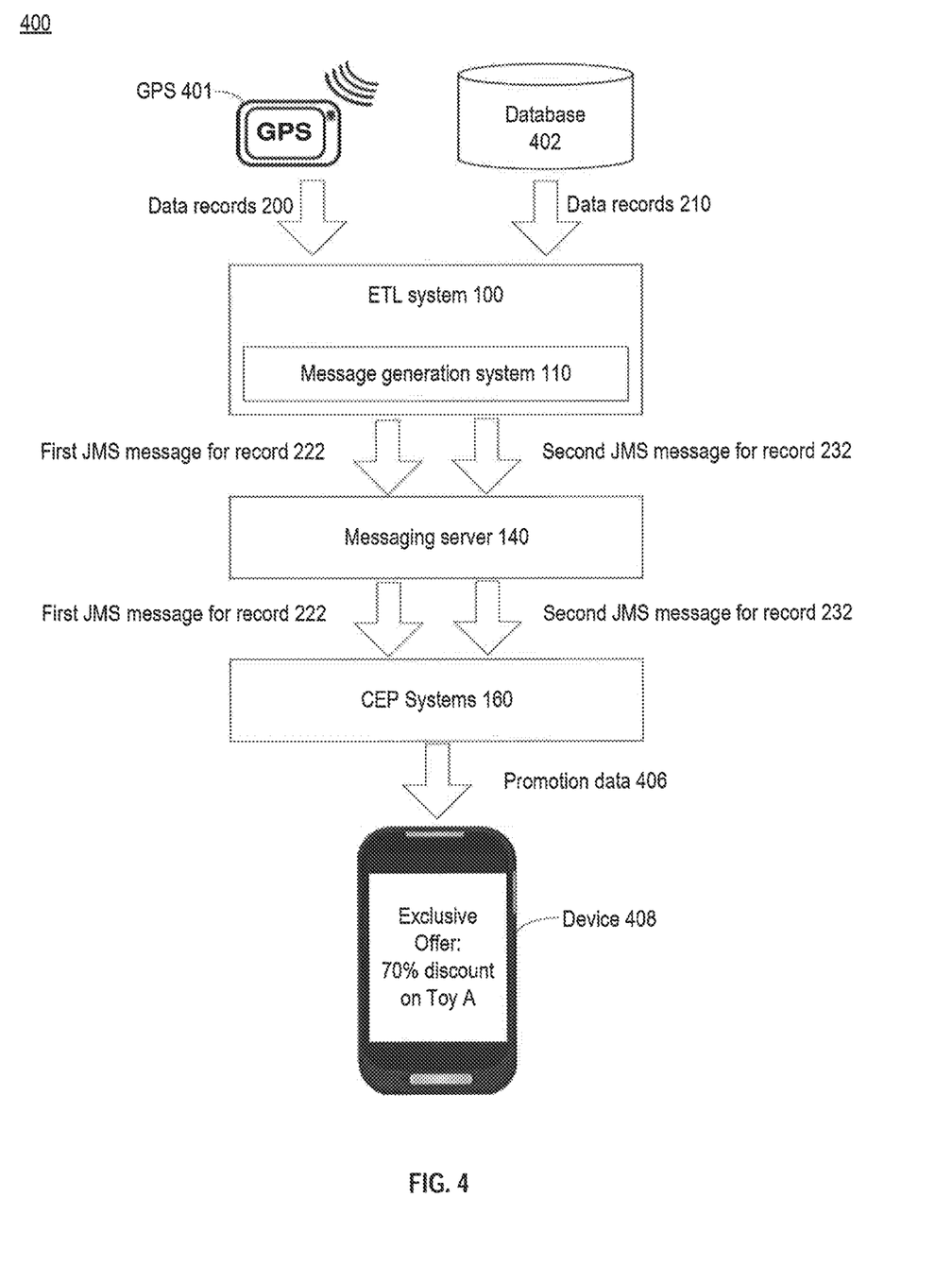
FIG. 4 illustrates an exemplary use case of an exemplary real-time message-based data analytics system according to some embodiments of the present disclosure.

FIG. 4 illustrates an exemplary use case of message-based data analytics system 100. As an illustrative example, message-based data analytics system 100 can be used to provide real-time offer management (RTOM), where a vendor can transmit promotion offer for a merchandise, in real-time, to a device (e.g., a smartphone) operated by a potential customer, after receiving location and shopping preference information for the potential customer.

As shown in FIG. 4, ETL system 101 receives file data from GPS 401 and database 402. The file data from GPS 401 can include data records 200 of FIG. 2, which may include associations between customer IDs and location information. The file data from database 402 can include data records 210 of FIG. 1, which may include associations between customer IDs and shopping preference information. The collection of file data can be scheduled by MFT collection unit 104 (e.g., collected once every minute, 30 seconds, etc.) and can be performed by data interface 102 simultaneously from GPS 401 and database 402.

ETL system 101 can perform record transformation to generate, for example, data records 222 and 232. The record transformation can include at least one of: data filtration, enrichment, data reduction, and event routing. For example, each of data records 222 and 232 include destination information and expiration time information for message transmission.

As soon as data record 222 is generated, ETL system 101 can perform message transformation to generate a first JMS message to include the contents of data record 222. ETL system 101 can then initiate a transmission of the first JMS message, by messaging server 140, by putting the first JMS message in a message queue at messaging server 140. Also, as soon as a data record 232 is generated, ETL system 101 can perform message transformation to generate a second JMS message to include the contents of data record 232, and then put the second JMS message in a message queue at messaging server 140. As discussed before, messaging server 140 can be a Java enabled messaging server, such as a TIBCOTM Enterprise Messaging Server, and can have computing resources to support multiple threads, with each thread being associated with a message queue. In such a case, the first and second JMS messages can be put in different message queues associated with different threads.

Messaging server 140 can transmit messages, including the first and second messages, based on information included in the messages. For example, based on the destination information in the header of first and second JMS messages, messaging server 140 can determine to transmit the messages to CEP systems 160. Also, the expiration time information can also determine a position of the messages in the queues, indicating priority and/or influencing when the messages are to be transmitted. Once a thread becomes available, a message at the head of a message queue associated with the available thread can then be transmitted to CEP systems 160.

CEP systems 160 may also generate promotion data. For example, after receiving the first and second JMS messages from messaging server 140, CEP systems 160 can generate promotion data based on the messages. For example, CEP systems 160 can correlate the first and second JMS messages based on a determination that they include the same customer ID (e.g., 12345), to determine that a potential customer, with a shopping preference for toys, is at a certain location at a certain time. Based on this determination, CEP systems 160 can acquire other information, such as promotion offer for toy products at that location, and transmit promotion offer data 406 to a device 408 (e.g., a smart phone) operated by that potential customer. In some cases, CEP systems 160 can also acquire and store information about promotion offer for toy products before receiving the first and second JMS messages, and then determine which promotion offer to transmit to the customer after receiving the first and second JMS messages. Because the first and second JMS messages are transmitted in real-time with respect to the acquisition of the location and preference information, CEP systems 160 can provide the promotion offer data to the potential customer when he or she is still at that location, or at vicinity to that location.

Computer System

Figure 5:
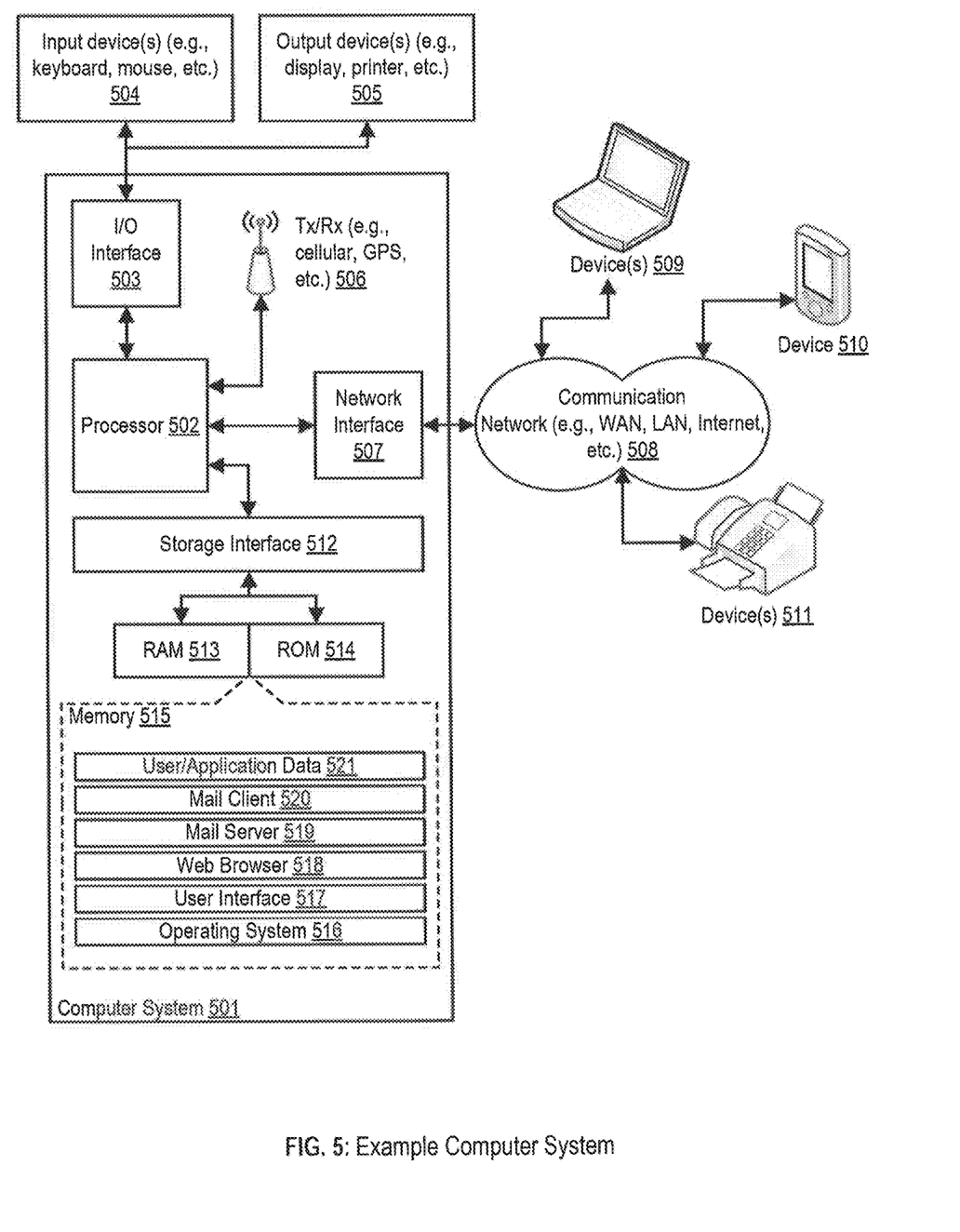
FIG. 5 is a block diagram of an exemplary computer system for implementing embodiments consistent with the present disclosure.

FIG. 5 is a block diagram of an exemplary computer system for implementing embodiments consistent with the present disclosure. Variations of computer system 501 may be used for implementing the devices and systems disclosed herein. Computer system 501 may comprise a central processing unit ("CPU" or "processor") 502. Processor 502 may comprise at least one data processor for executing program components for executing user- or system-generated requests. A user may include a person, a person using a device such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 510, 511, and 512. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 502 may be disposed in communication with one or more memory devices (e.g., RAM 513, ROM 514, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, the databases disclosed herein.

The memory devices may store a collection of program or database components, including, without limitation, an operating system 516, user interface application 517, web browser 518, mail server 519, mail client 520, user/application data 521 (e.g., any data variables or data records discussed in this disclosure), etc. The operating system 516 may facilitate resource management and operation of the computer system 501. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 501 may implement a web browser 518 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL) Transport Layer Security (TLS), etc. Web browsers may utilize facilities such as AJAX, DHTML, Adobe Flash, JavaScript, Java, application programming interfaces (APIs), etc. In some embodiments, the computer system 501 may implement a mail server 519 stored program component. The mail server may be an Internet mail server such as Microsoft Exchange, or the like. The mail server may utilize facilities such as ASP, ActiveX, ANSI C++/C#. Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 501 may implement a mail client 520 stored program component. The mail client may be a mail viewing application, such as Apple Mail, Microsoft Entourage, Microsoft Outlook, Mozilla Thunderbird, etc.

In some embodiments, computer system 501 may store user/application data 521, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination, The specification has described methods and systems for real-time message-based information generation. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context dearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A system for real-time message-based information generation for providing real-time merchandise offer to a customer in a store, the system comprising:
one or more hardware processors; and
a memory storing instructions executable by the one or more hardware processors that support multiple-thread processing for:
receiving a plurality of input data files from a plurality of source systems in a plurality of data formats, each input data file comprising a plurality of records;
extracting, from each input data file, the plurality of records on a record-by-record basis;
transforming each extracted record from among the plurality of records to a transformed data record that complies with a messaging format;
constructing a message for each transformed data record according to the messaging format by mapping each field of the transformed data record to a field of the message, the message comprising a header and a body;
determining expiration time that indicates a time window within which the message is to be transferred to a second system, based on physical size of the store, association of a customer identifier with location information of the store, time information indicating time at which the location information is acquired, shopping preference of the customer, and rate at which the customer is travelling in the store; and
prioritizing transfer of the message to the second system by queuing the message based on the expiration time, wherein the message enables the second system to generate a merchandise offer information based on the transformed data record.

2. The system of claim 1, wherein the transforming of each extracted record comprises: mapping each of a plurality of fields associated with each extracted record to a messaging server property associated with a messaging server.

3. The system of claim 2, wherein the transforming of each extracted record further comprises at least one of data filtration, enrichment, data reduction, or event routing.

4. The system of claim 2, wherein the messaging server is a Java-based messaging server, and wherein the messaging server property is a Java-based messaging server property.

5. The system of claim 1, wherein receiving the plurality of input data files comprises:
collecting, via a managed file transfer (MFT) unit, the plurality of input data files from at least one source system on a real-time basis via managed file transfers;
initiating a handshake between the MFT unit and the one or more hardware processors via a data exchange server and a message broker agent; and
transferring the plurality of input data files from the MFT unit to the one or more hardware processors.

6. The system of claim 1, wherein the plurality of input data files is collected simultaneously from the plurality of source systems in the plurality of data formats.

7. The system of claim 1, wherein the second system comprises an external Enterprise Messaging Service server configured to provide real-time data analytics or an external Complex Event Processing engine configured to provide complex event processing services.

8. A method for real-time message-based information generation for providing real-time merchandise offer to a customer in a store, the method being performed by one or more hardware processors that support multiple-thread processing, the method comprising:
receiving a plurality of input data files from a plurality of source systems in a plurality of data formats, each input data file comprising a plurality of records;

extracting, from each input data file, the plurality of records on a record-by record basis;

transforming each extracted record from among the plurality of records to a transformed data record that complies with a messaging format;

constructing a message for each transformed data record according to the messaging format by mapping each field of the transformed data record to a field of the message, the message comprising a header and a body;

determining expiration time that indicates a time window within which the message is to be transferred to a second system, based on physical size of the store, association of a customer identifier with location information of the store, time information indicating time at which the location information is acquired, shopping preference of the customer, and rate at which the customer is travelling in the store; and prioritizing transfer of the message to the second system by queuing the message based on the expiration time, wherein the message enables the second system to generate a merchandise offer information based on the transformed data record.

9. The method of claim 8, wherein the transforming of each extracted record comprises: mapping each of a plurality of fields associated with each extracted record to a messaging server property associated with a messaging server.

10. The method of claim 9, wherein the transforming of each extracted record further comprises at least one of data filtration, enrichment, data reduction, or event routing.

11. The method of claim 9, wherein the messaging server is a Java-based messaging server, and wherein the messaging server property is a Java-based messaging server property.

12. The method of claim 8, wherein receiving the plurality of input data files comprises:

collecting, via a managed file transfer (MFT) unit, the plurality of input data files from at least one source system on a real-time basis via managed file transfers;

initiating a handshake between the MFT unit and the one or more hardware processors via a data exchange server and a message broker agent; and transferring the plurality of input data files from the MFT unit to the one or more hardware processors.

13. The method of claim 8, wherein the plurality of input data files is collected simultaneously from the plurality of source systems in the plurality of data formats.

14. The method of claim 8, wherein the second system comprises an external Enterprise Messaging Service server configured to provide real-time data analytics or an external Complex Event Processing engine configured to provide complex event processing services.

15. A non-transitory computer readable storage medium storing a program that, when executed by one or more hardware processors that support multiple-thread processing, causes the one or more hardware processors to perform a method for real-time message-based information generation for providing real-time merchandise offer to a customer in a store, the method comprising:

receiving a plurality of input data files from a plurality of source systems in a plurality of data formats, each input data file comprising a plurality of records;

extracting, from each input data file, the plurality of records on a record-by-record basis;

transforming each extracted record from among the plurality of records to a transformed data record that complies with a messaging, format;

constructing a message for each transformed data record according to the messaging format by mapping each field of the transformed data record to a field of the message, the message comprising a header and body;

determining expiration time that indicates a time window within which the message is to be transferred to a second system, based on physical size of the store, association of a customer identifier with location information of the store, time information indicating time at which the location information is acquired, shopping preference of the customer, and rate at which the customer is travelling in the store; and prioritizing transfer of the message to the second system by queuing the message based on the expiration time, wherein the message enables the second system to generate merchandise offer information based on the transformed data record.

16. The medium of claim 15, wherein the transforming of each extracted record comprises: mapping each of a plurality of fields associated with each extracted record to a messaging server property associated with a messaging server.

17. The medium of claim 16, wherein the transforming of each extracted record further comprises at least one of data filtration, enrichment, data reduction, or event routing.

18. The medium of claim 16, wherein the messaging server is a Java-based messaging server, and wherein the messaging server property is a Java-based messaging server property.

19. The medium of claim 16, wherein receiving the plurality of input data files comprises:

collecting, via a managed file transfer (MFT) unit, the plurality of input data files from at least one source system on a real-time basis via managed file transfers;

initiating a handshake between the MFT unit and the one or more hardware processors via a data exchange server and a message broker agent; and transferring the plurality of input data files from the MFT unit to the one or more hardware processors.

20. The medium of claim 16, wherein the second system comprises an external Enterprise Messaging Service server configured to provide real-time data analytics or an external Complex Event Processing engine configured to provide complex event processing services.

* * * * *